United States Patent [19]

Ando

[11] Patent Number: 4,780,254
[45] Date of Patent: Oct. 25, 1988

[54] METHOD AND APPARATUS FOR CONTROLLING THE HUMIDITY IN A CLOSED CHAMBER

[75] Inventor: Iwao Ando, Hachioji, Japan

[73] Assignee: Yukyan Kabushiki Kaisha, Tokyo, Japan

[21] Appl. No.: 59,129

[22] Filed: Jun. 8, 1987

[30] Foreign Application Priority Data

Feb. 20, 1987 [JP] Japan ............................ 62-37348

[51] Int. Cl.$^4$ ............................................ G05D 22/02
[52] U.S. Cl. ...................... 261/81; 236/44 A; 236/44 E; 239/102.2; 261/DIG. 48
[58] Field of Search .................. 261/DIG. 48, 81; 236/44 A, 44 E, 78 D; 239/102.2

[56] References Cited

U.S. PATENT DOCUMENTS

| | | | |
|---|---|---|---|
| 3,443,121 | 5/1969 | Weisbrod | 236/46 F |
| 4,420,113 | 12/1983 | Lacroix | 236/46 F |
| 4,546,916 | 10/1985 | Tsuaki | 236/44 A |
| 4,623,969 | 11/1986 | Bensoussan et al. | 236/47 |
| 4,643,351 | 2/1987 | Fukamachi et al. | 236/44 E |

FOREIGN PATENT DOCUMENTS

| | | | |
|---|---|---|---|
| 54-124550 | 9/1979 | Japan | 261/DIG. 48 |
| 60-159536 | 8/1985 | Japan | 236/44 E |
| 60-159535 | 8/1985 | Japan | 236/44 E |

*Primary Examiner*—Tim Miles
*Attorney, Agent, or Firm*—Bauer & Schaffer

[57] ABSTRACT

The humidity within a controlled chamber is detected with a humidity detector and the proportional value, integrated value and differentiated value of the difference between the detected signal and a preset objective value are added to form an operation amount signal. A predetermined period is divided into a spray time during which an oscillator of an ultrasonic humidifier is operated at an amplitude obtaining a predetermined sprayed amount per unit time and a stopping time during which the oscillator cooperated with such small amplitude as to generate no spray. The predetermined period is repeated and the spraying time in each fixed period is adjusted in response to the above mentioned operation amount signal to keep the humidity within the controlled chamber constant.

3 Claims, 7 Drawing Sheets

METHOD AND APPARATUS FOR CONTROLLING THE HUMIDITY IN A CLOSED CHAMBER

FIELD OF THE INVENTION

This invention relates to a humidification control system for keeping the humidity within a controlled chamber at a fixed objective value by using an ultrasonic humidifier.

The above mentioned controlled chamber means any closed space in which the humidity is to be controlled.

BACKGROUND OF THE INVENTION

Figure 7:
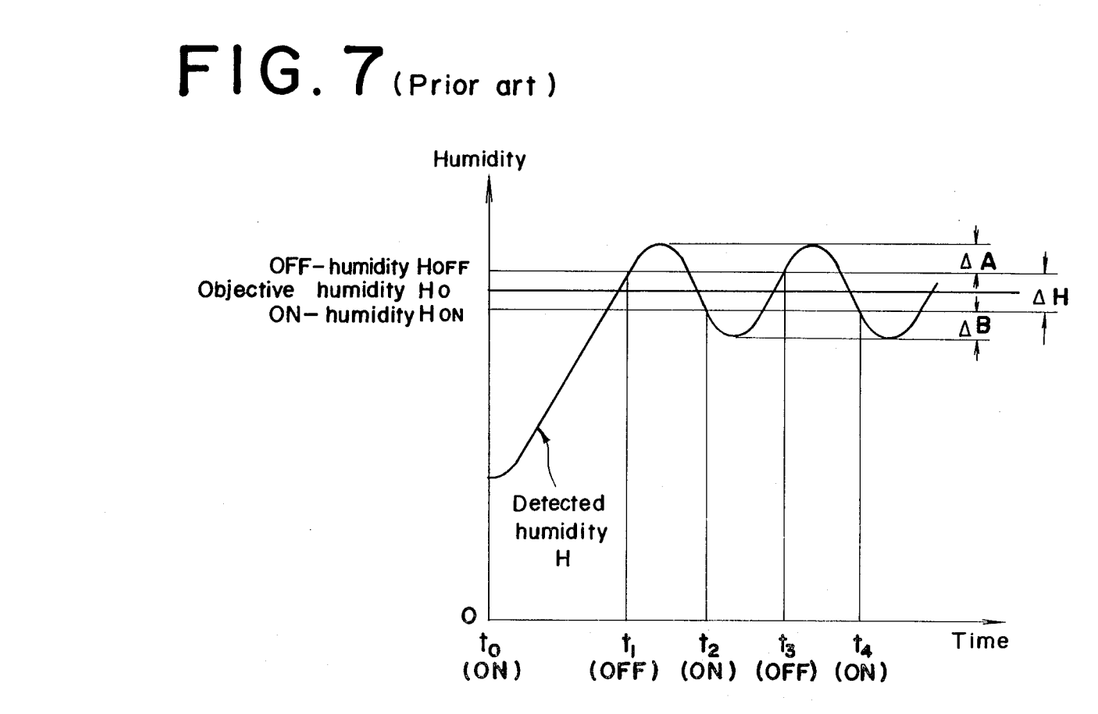
FIG. 7 is a diagram showing the relationship between the time lapse and humidity with a conventional humidificatiin control system.

Heretofore, in order to keep the humidity within a controlled chamber constant, through the use of an ultrasonic humidifier, the humidity within the controlled chamber has been controlledby such ON-OFF-operations as are shown in FIG. 7.

That is to say, as shown in FIG. 7, an ON-humidity $H_{ON}$ and OFF-humidity $H_{OFF}$ having a hysteresis $\Delta H$ for an objective humidity $H_O$ are determined, the humidity within the controlled chamber is detected with a humidity detector, at the time points $t_1$ and $t_3$ when the detected humidity reaches the OFF-humidity $H_{OFF}$ while rising, the oscillation of the oscillator of the ultrasonic humidifier is fuller stopped and, at the time points $t_2$ and $t_4$ when the detected humidity H reaches the ON-humidity while lowering, the oscillator of the ultrasonic humidifier is operated with an amplitude of 100%.

In the case shown in FIG. 7, the detected humidity H at the control starting time point $t_0$ is so low that the initiated operation of the oscillator of the ultrasonic humidifier must be with an amplitude of 100%.

However, as the point at which the ultrasonic humidifier is placed and the point at which the humidity detector is placed are usually spaced from each other, the time of transmitting air humidified by spray is comparatively long and the time it takes for the humidity detector to sense the level of humidity itself can not be neglected. Therefore, in the known humidification controlling system, the transmission delay and wasted time are generally so large that, in the above mentioned conventional humidification controlling system, there have been defects that, as shown in FIG. 7, an overshoot $\Delta A$ and undershoot $\Delta B$ is disadvantageously generated. Therefore a cycling (continued oscillation) of a large amplitude will occur and the humidity within the controlled chamber will not be able to be precisely kept constant.

Also, in the conventional humidification controlling system, as described above, the hysteresis $\Delta H$ is provided to somewhat reduce the frequency of the ON-OFF-operations (the oscillation of 100% amplitude and the precise stop of the oscillation) of the oscillator of the ultrasonic humidifier. However, the precision will be further reduced by the part of the hysteresis $\Delta H$, therefore the hysteresis can not be made so large and therefore the above mentioned oscillator will be so high in the ON-OFF frequency as to be likely to be broken.

BRIEF SUMMARY OF THE INVENTION

The present invention has it as an object the provision of a humidification control system having an ultrasonic humidifier wherein the humidity within a controlled chamber can be stably and with highly precision kept at a fixed objective value without causing cycling or offset and wherein the humidity can be adjusted within a short time even in such case where an external turbulence is applied as for example where the door of the controlled chamber is opened and closed so that the oscillator of the ultrasonic humidifier is not likely to be broken.

Therefore, in the present invention, the humidity within the controlled chamber is detected with a humidity detector and the proportional value, integrated value and differentiated value of the difference between the detected signal and the preset objective value signal are added to be an operation amount signal.

A predetermined period is divided into a spraying time during which oscillation of oscillating the oscillator of the ultrasonic humidifier with an amplitude is effected so that a predetermined sprayed amount per unit time is obtained and a stopping time during which oscillation of the oscillator is effected at such small amplitude that no spray is generated from the ultrasonic humidifier.

The above mentioned predetermined period is repeated and the spraying time in each fixed period is adjusted in response to the above mentioned operation amount signal to keep the humidity within the controlled chamber constant.

According to the present invention, the predetermined period is divided into repetitive spraying times and stopping time which if viewed at any given instant, exhibits maximum (100%) spray per unit time during the spraying time and 0% spray during the stopping time. The average of the abiove mentioned sprayed amounts will be $$\frac{\text{Spraying time}}{\text{Predetermined period} (= \text{spraying time} + \text{stopping time})} \times 100(\%).$$

Therefore, if the predetermined period is made somewhat shorter, when the spraying time is varied from 0 to the predetermined period, the sprayed amount per unit time will be able to be continuiously varied from 0 to 100%.

Thus, as the spraying time in each successive predetermined period is adjusted in response to an operation amount signal, the sprayed amount in response to the above mentioned operation amount signal will be generated from the ultrasonic humidifier.

Further, in the present invention, as the humidity within the controlled chamber is detected and the proportional value, integrated value and differentiated value of the difference between the detected signal and a preset objective value signal are added to formm the above mentioned operation amount signal, a control by a PID operation in which the humidity within the controlled chamber is made a controlled amount and the sprayed amount from the ultrasonic humidifier is made an operation amount will be obtained.

Therefore, there are advantages that, though the time of transmitting air humidified by spraying is comparatively long and the sensing time of the humidity detector itself can not be neglected, that is, though the transmission delay and wasted time are large, the humidity within the controlled chamber can be stably and with high precision kept at a fixed objective value without causing a cycling or offset and can be adjusted within a short time even when an external turbulence occurs as in case the door of the controlled chamber is opened and closed.

Further, according to the present invention, there are advantages that, although when the above mentioned predetermined period is set to be comparatively short, and the frequency of repeating the spraying time and stopping time will be high nevertheless, during the stopping time, the oscillator of the ultrasonic humidifier will not be fully stopped from oscillating, as in the prior systems but will continue to oscillate with such small amplitude as will generate no spray from the ultrasonic humidifier and will be, so to say, warming up and will not be likely to be broken even if the above mentioned frequency is high.

DETAILED DESCRIPTION OF THE INVENTION

The humidification controlling system of the present invention shall be explained with reference to the apparatus shown in FIG. 1.

The reference numeral 1 represents a controlled chamber and 2 represents a humidity detector for detecting the humidity within the controlled chamber 1. For example, a high molecular weight humidity sensor can be used for this humidity detector 2.

The humidity within the controlled chamber 1 is detected with the above mentioned humidity detector 2 and the proportional value, integrated value nd differentiated value of the difference between the detected signal and a preset objective value signal are added together to form an operation amount signal.

Figure 1:
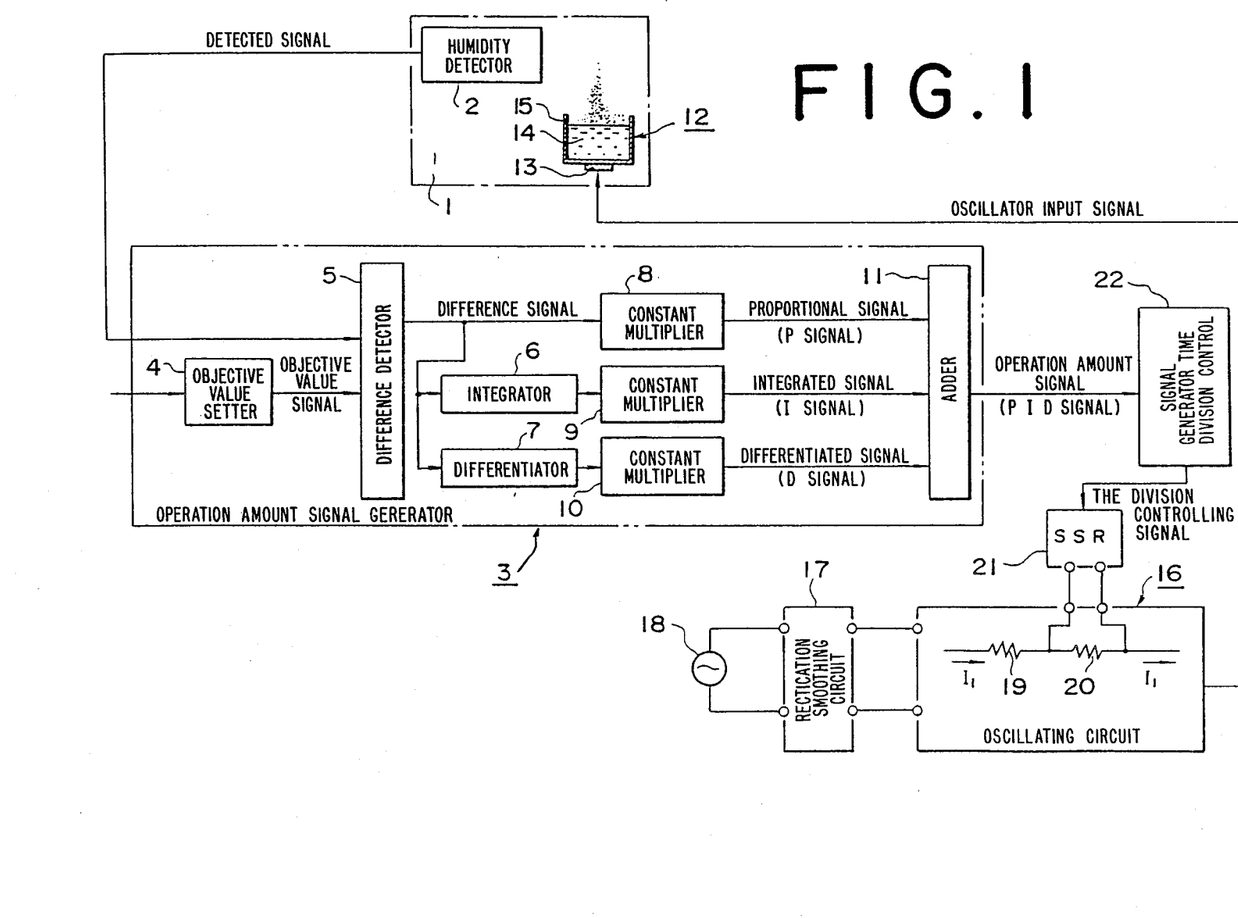
FIG. 1 is a schematic view of an apparatus using a humidification control system of the present invention.

In the case of the apparatus shown in FIG. 1, the detected signal from the above mentioned humidity detector 2 is fed into an operation amount signal generator 3 and the above mentioned operation amount signal (PID signal) is the output of the operation amount signal generator. The amount signal generator 3 is formed of an objective value setter 4, difference detector 5, integrator 6, differentiator 7, constant multipliers 8, 9 and 10 and adder 11. Therefore, when the user sets, in advance, an objective humidity within the controlled chamber 1 using the objective value setter 4, the objective value signal and the detected signal from the humidity detector 2 are fed into the difference detector 5, the output from the difference detector 5 is the difference signal. This difference signal is multiplied by a predetermined constant by the constant multiplier 8 and the proportional value of the above mentioned difference will be output as a proportional signal (P signal) into the adder 11. The difference signal is also integrated by the integrator 6 and thereafter multiplied by a predetermined constant by the constant multiplier 9 and output as an integrated signal (I signal) into the adder 11. Further, the above mentioned difference signal is also differentiated by the differentiator 7 and further multiplied by a predetermined constant by the constant multiplier 10 and output as a differentiated signal (D signal) into the adder 11. Conseuently, the above mentioned proportional signal, integrated signal and differential signal will be added by the adder 11 and an operation amount signal (PID signal) of the sum of the proportional value, integrated value and differentiated value of the difference between the above mentioned detected signal and the preset objective value signal will be output from the above mentioned adder 11.

Also, in the present invention, a predetermined period T is divided into a spraying time $t_1$ of oscillating an oscillator 13 of an ultrasonic humidifier 12 with an amplitude obtaining a predetermined spray amount per unit time from the ultrasonic humidifier and a stopping time $t_2$ during which the oscillator 13 of the above mentioned ultrasonic humidifier 12 functions with such small amplitude as to generate no spray from the ultrasonic humidifier.

In the apparatus shown in FIG. 1, the ultrasonic humidifier 12 is formed of a water tank 15 containing water 14 to be sprayed, an oscillator 13 fitted to the bottom of the tank 15 and an oscillating circuit 16 supplying as an oscillator input signal to the oscillator 13 an alternating current voltage of the same frequency as of the ultrasonic waves. A rectification smoothing circuit 17 is connected on the output side of the oscillating circuit 16 and, an alternating current source 18 is connected to the input side of the rectification smoothing circuit 17 so that a direct current voltage is fed into the oscillating circuit 16. The oscillating circuit 16 can be selected from a variety of types. In FIG. 1, the oscillating circuit has a series circuit of resistances 19 and 20 within it so that an alternating current voltage having an amplitude determined by the size of the current $I_1$ flowing through this circuit and the same predetermined frequency (constant) as of the ultrasonic waves may be supplied as an oscillator input signal. The above mentioned resistance 20 is connected at both ends to an SSR (solid state relay) 21 and the resistance values of the above mentioned resistances 19 and 20 are so properly determined that, when the above mentioned SSR 21 is ON, the amplitude of the oscillation of the oscillator 13 will become so large that a predetermined sprayed amount per unit time will be obtained from the ultrasonic humidifier 12 (specifically from the sprayed water tank 15) but, when the above mentioned SSR 21 is OFF, the oscillation of the oscillator 13 will become so small that no spray will be generated from the ultrasonic humidifier 12. That is to say, when the above mentioned SSR 21 is ON, the resistance 20 will be short-circuited at both ends, so that the above mentioned current $I_1$ will become large, the amplitude of the oscillator input signal will become large and the oscillator 13 will oscillate with an amplitude obtaining a predetermined sprayed amount per unit time from the ultrasonic humidifier 12. When the above mentioned SSR 21 is OFF, the above mentioned current $I_1$ will become smaller, the amplitude of the oscillator input signal will become smaller and the oscillator 13 will oscillate with such small amplitude as will generate no spray from the ultrasonic humidifier 12. Therefore, the ON-time of the SSR 21 corresponds to the above mentioned spraying time $t_1$ and the OFF-time of the SSR 21 corresponds to the stopping time $t_2$. The SSR 21 is controlled to be ON and OFF by a time division controlling signal from a time division controlling signal generator 22 and a predetermined period T is divided into the ON-time of the SSR 21 and the OFF-time of the SSR 21. Therefore, the predetermined period T is divided into the spraying time $t_1$ and stopping time $t_2$.

In the present invention, the above mentioned predetermined period T is repeated and the spraying time $t_1$ in each predetermined period T is adjusted in response to the above mentioned operation amount signal so that the humidity within the controlled chamber 1 may be kept constant at the objective value.

The time division controlling signal will be periodically repeatedly generated from the time division controlling signal generator in the above mentioned predetermined period T and the length of the ON-time of the SSR 21 in each predetermined period will be adjusted on the basis of the operation amount signal put into the time division controlling signal generator 22. That is to say, the higher the level of the operation amount signal, the longer the ON-time of the SSR 21. The lower the level, the shorter the ON-time of the SSR 21.

Figure 2:
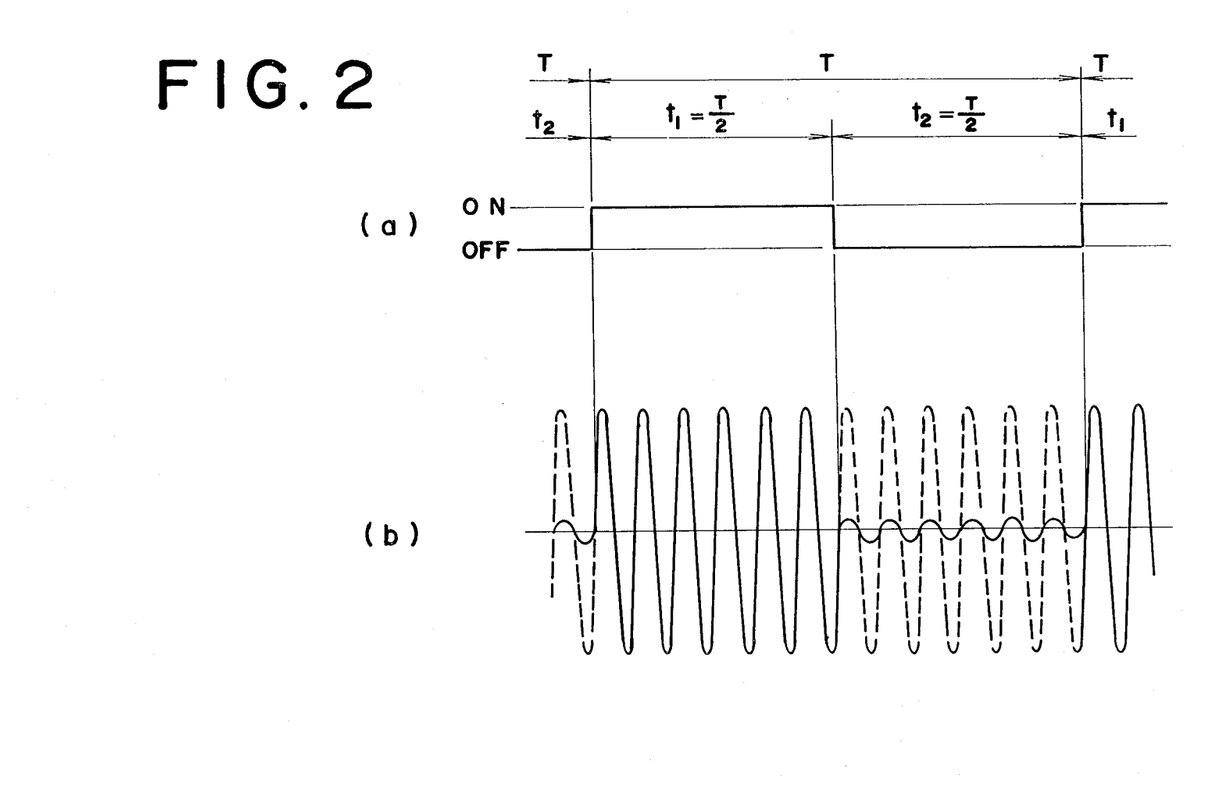
FIGS. 2 to 5 show the operating state in respective sprayed amounts, (a) being a time chart of an SSR (Solid State Relay) and (b) being a waveform diagram of an oscillator input signal.
Figure 3:
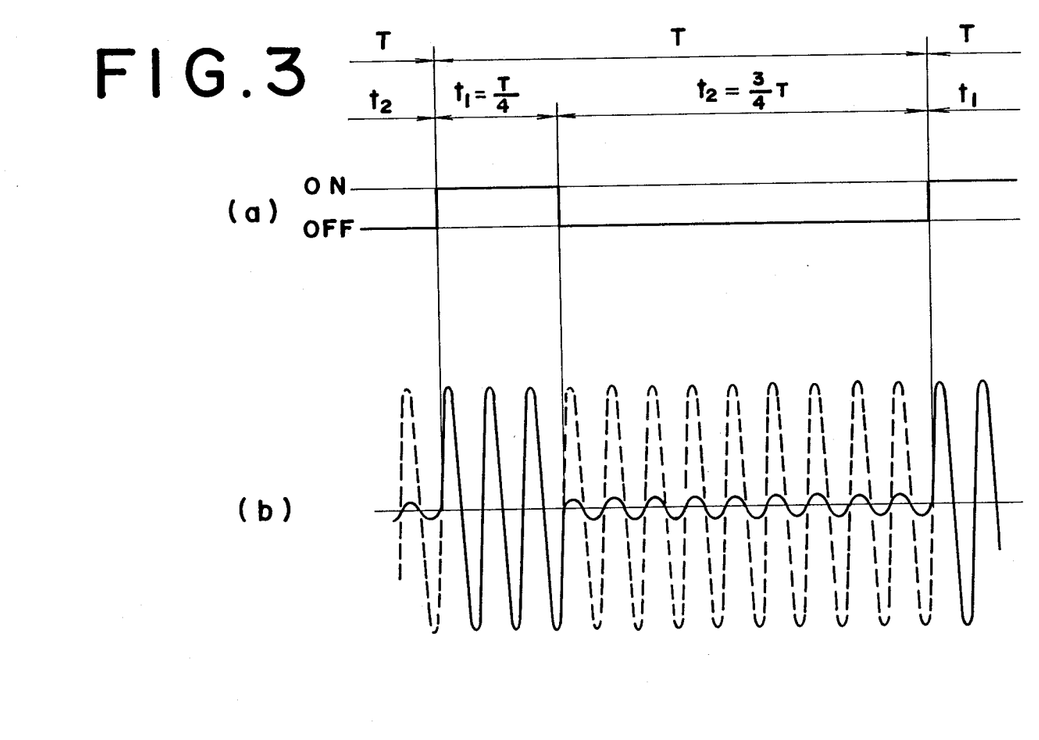
Figure 4:
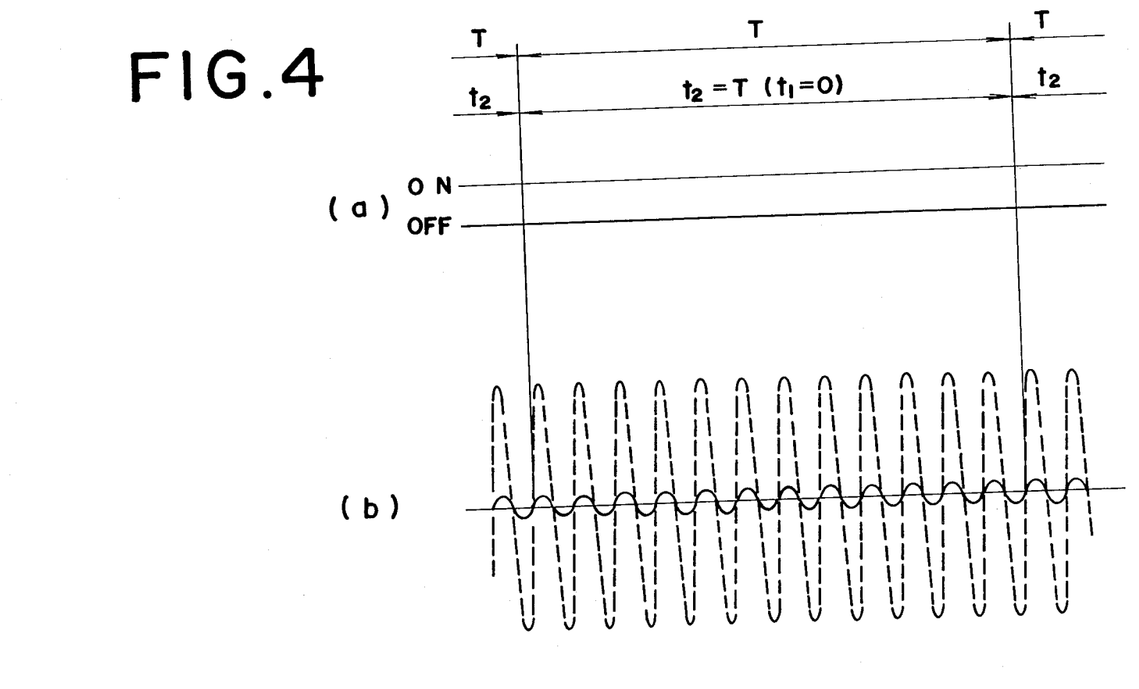
Figure 5:
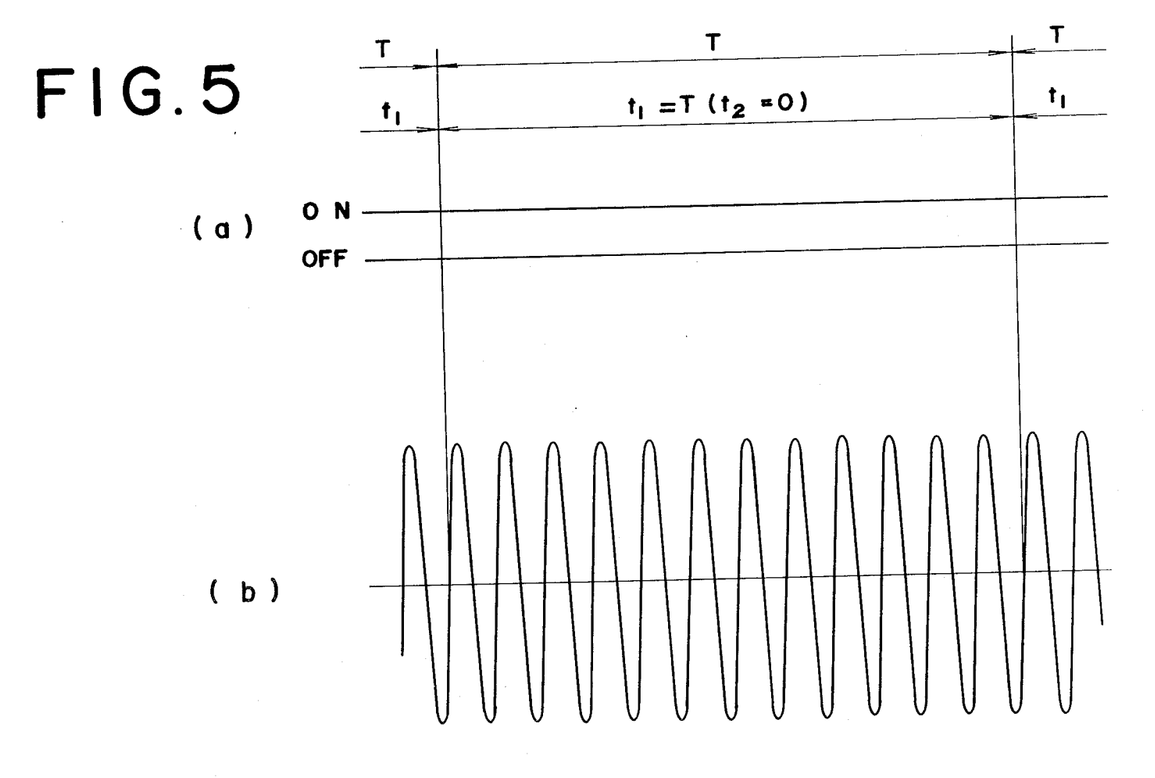

According to the above as the predetermined period T is divided into the spraying time $t_1$ and stopping time $t_2$ and is repeated, if seen instantaneously, the sprayed amount per unit time from the ultrasonic humidifier 12 will be 100% (i.e. maximum) during the spraying time $t_1$ and will be 0% during the stopping time $t_2$ but will be $$\frac{t_1}{T(=t_1+t_2)} \times 100(\%)$$

on the average. Therefore, if the above mentioned predetermined period T is made somewhat shorter, when the spraying time $t_1$ is varied from 0 to the predetermined period T, the sprayed amount per unit time from the ultrasonic humidifier 12 will be able to be continuously varied from 0 to 100%. FIG. 2 shows the state where the sprayed amount per unit time from the ultrasonic humidifier 12 is 50%, FIG. 3 shows the state at 25%, FIG. 4 shows the state at 0% and FIG. 5 shows the state at 100%. In these diagrams, (a) is a time chart of the SSR 21 and (b) is a waveform diagram of the oscillator input signal.

In the present invention, as the spraying time $t_1$ in the above mentioned period T is adjusted in response to the operation amount signal, the sprayed amount in response to the above mentioned operation amount will be generated from the ultrasonic humidifier 12.

Further, in the present invention, as the humidity within the controlled chamber 1 is detected with the humidity detector 2 and the proportional value, integrated value and differentiated value of the difference between the detected signal and the preset objective value signal are added to be the above mentioned operation amount signal, a control by a PID operation in which the humidity within the controlled chamber 1 is made a controlled amount and the sprayed amount from the ultrasonic humidifier 12 is made an operation amount will be realized.

Figure 6:
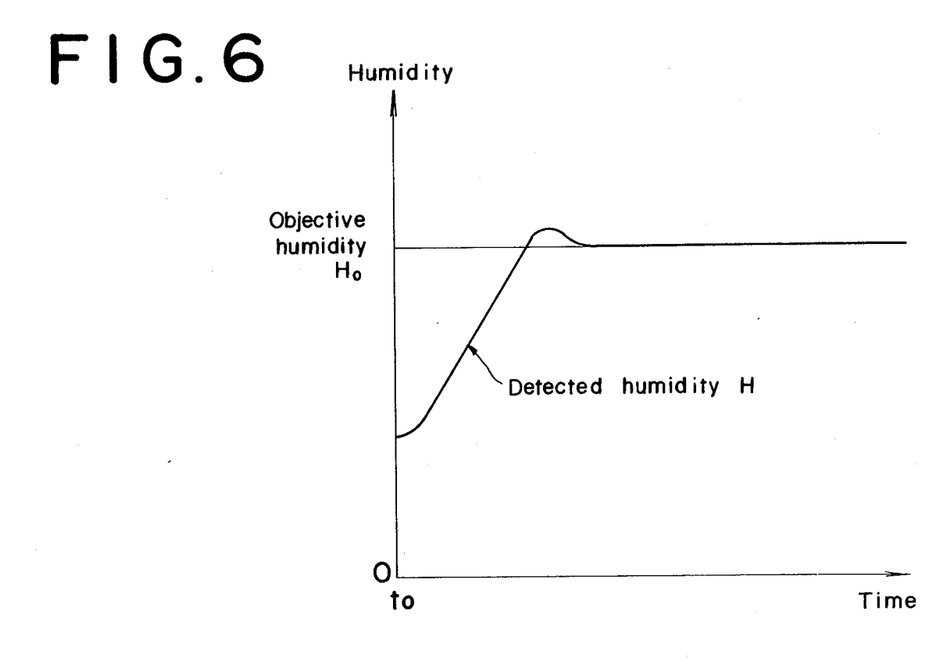
FIG. 6 is a diagram showing the relationship between the time lapse and humidity with the humidity control system of the present invention.

Therefore, according to the present invention, there are advantages that, though the time of transmitting air humidified by spraying is comparatively long and the sensing time of the humidity detector 2 itself can not be neglected, that is, though the transmission delay and wasted time are large, as in FIG. 6, the humidity within the controlled chamber can be stably and precisely kept at a fixed objective value without causing a cycling or offset and can be adjusted within a short time even when an external turbulence is applied as in case the door of the controlled chamber is opened and closed.

Further, according to the present invention, there are advantages that, in case the above mentioned predetermined period T is set to be comparatively short, and the frequency of repeating the spraying time $t_1$ and stopping time $t_2$ will be high nevertheless, during the stopping time $t_2$, the oscillator 13 of the ultrasonic humidifier 12 will not fully stop oscillating as in the past but will oscillate with such small amplitude as will generate no spray from the ultrasonic humidifier 12 and will be, so to say, warming up and will not be likely to be broken even if the above mentioned frequency is high.

By the way, the shorter the above mentioned predetermined period T, the higher the precision with which the humidity within the controlled chamber 1 can be kept at a fixed objective value. In the humidification controlling system, the transmission delay and wasted time are so long that, even if the predetermined period T is set to be comparatively long (for example, about 3 to 30 seconds), the precision will be able to be made high enough.

It is intended that, once the objective humidity within the controlled chamber is set, it will not vary. However, the objective value can be varied with the lapse of time, for example, by giving a controlling signal to the objective value setter 4 from outside.

As described in detail in the above, according to the present invention, there are obtained effects that the humidity within the controlled chamber can be stably and precisely kept at a fixed objective value withut causing a cycling or offset and can be adjusted within a short time even in such case an external turbulence is applied as in case the door of the controlled chamber is opened and closed and that the oscillator of the ultrasonic humidifier is not likely to be broken.

What is claimed is:

1. The method of controlling the humidity of a closed chamber using the spray oscillator of an ultrasonic humidifier, comprising the steps of:

obtaining a signal indicative of the actual humidity within said closed chamber and adding the proportional value, integrated value and differentiated value of the difference between the obtained signal and a present objective value signal to obtain an operation amount signal;

dividing a predetermined time period into a spraying time and a stopping time and operating the spray oscillator during the spraying time at a fixed amplitude providing a predetermined amount of spray per unit time and during said stopping time at such small amplitude as to generate no spray from the ultrasonic humidifier; and repeating the operation of said oscillator during successive predetermined periods while adjusting the length of the spraying time in each predetermined time period in response to the level of said operation amount signal to keep the humidity within the closed chamber constant.

2. The method according to claim 1, wherein the oscillator is operated during said spray time to provide maximum spray per unit time.

3. The method according to claim 1, including the step of initially setting the objective value signal at a selective level.

4. Apparatus for controlling the operation of a spray oscillator in an ultrasonic humidifier to obtain a constant level of humidity within a closed chamber, comprising sensing means located within said closed chamber to detect the level of humidity therein and provide a signal indicative thereof; means for generating an operation amount signal from the addition of the proportional value, the integrated value and the differentiated value of the difference between the detected signal and a present objective value signal; means for dividing a predetermined time period into a first time portion and a second time portion; means for operating the oscillator of said ultrasonic humidifer during said first time portion at a fixed amplitude providing a predetermined level of spray per unit time and during said second time portion at such a small amplitude as to effectively generate no spray; means for maintaining the operation of said oscillator during successively repetitive predetermined time periods; and means for simultaneously adjusting the length of said first time portion in each predetermined time period in response to the instantaneous level of said operating amount signal to thereby maintain the humidity within said closed chamber constant.

5. The apparatus according to claim 4, including means for selectively determining the level of said preset objective signal.

* * * * *